(12) United States Patent
Maeyama

(10) Patent No.: US 7,735,828 B2
(45) Date of Patent: Jun. 15, 2010

(54) SHEET CONVEYANCE DEVICE, IMAGE READER, AND IMAGE FORMING APPARATUS CAPABLE OF FEEDING SHEETS EFFECTIVELY

(75) Inventor: Yuichiro Maeyama, Kawasaki (JP)

(73) Assignee: Ricoh Company, Ltd., Ohta-Ku (JP)

( * ) Notice: Subject to any disclaimer, the term of this patent is extended or adjusted under 35 U.S.C. 154(b) by 0 days.

(21) Appl. No.: 12/379,085

(22) Filed: Feb. 12, 2009

(65) Prior Publication Data

US 2009/0212494 A1   Aug. 27, 2009

(30) Foreign Application Priority Data

Feb. 26, 2008   (JP)   ............... 2008-045032

(51) Int. Cl.
*B65H 5/02*   (2006.01)
(52) U.S. Cl. ...................... 271/272; 271/274
(58) Field of Classification Search .................. 271/226, 271/228, 272–274
See application file for complete search history.

(56) References Cited

U.S. PATENT DOCUMENTS 5,540,427 A * 7/1996 Nitta et al. ................. 271/274

| 7,080,836 B2 * | 7/2006 | Hamada et al. ............. 271/274 |
| 2004/0178571 A1 * | 9/2004 | Ohama et al. ............... 271/272 |

FOREIGN PATENT DOCUMENTS

JP   4024486   10/2007

OTHER PUBLICATIONS

Abstract for JP 2002-284388 published on Oct. 3, 2002.

* cited by examiner

*Primary Examiner*—Kaitlin S Joerger
(74) *Attorney, Agent, or Firm*—Harness, Dickey & Pierce, P.L.C.

(57) ABSTRACT

In a sheet conveyance device, a plurality of driving rollers opposes a plurality of driven rollers to form nip portions between the plurality of driving rollers and the plurality of driven rollers. A center portion of a driving shaft for supporting the plurality of driving rollers in an axial direction of the driving shaft is bent downstream in a sheet conveyance direction so that the plurality of driving rollers is shifted downstream in the sheet conveyance direction and tilted with respect to the sheet conveyance direction in a V-like shape about a center line in a width direction of a sheet. The plurality of driven rollers is shifted downstream in the sheet conveyance direction by an amount determined by an amount by which the plurality of driving rollers is shifted downstream in the sheet conveyance direction.

19 Claims, 5 Drawing Sheets

SUB-SCANNING DIRECTION

ORIGINAL DOCUMENT SHEET CONVEYANCE DIRECTION

SHEET CONVEYANCE DEVICE, IMAGE READER, AND IMAGE FORMING APPARATUS CAPABLE OF FEEDING SHEETS EFFECTIVELY

PRIORITY STATEMENT

The present patent application claims priority from Japanese Patent Application No. 2008-045032, filed on Feb. 26, 2008, in the Japan Patent Office, the entire contents of which are hereby incorporated herein by reference.

BACKGROUND OF THE INVENTION

1. Field of the Invention

Example embodiments generally relate to a sheet conveyance device, an image reader, and an image forming apparatus, and more particularly, to a sheet conveyance device, an image reader, and an image forming apparatus for feeding sheets.

2. Description of the Related Art

Related-art image forming apparatuses, such as copiers, printers, facsimile machines, or multifunction printers having at least one of copying, printing, scanning, and facsimile functions, typically form a toner image on a recording medium (e.g., a sheet) based on image data using electrophotography. Thus, for example, a charger charges a surface of an image carrier; an optical writer emits a light beam onto the charged surface of the image carrier to form an electrostatic latent image on the image carrier according to the image data; a development device develops the electrostatic latent image with a developer (e.g., toner) to form a toner image on the image carrier; the toner image is then transferred from the image carrier onto a sheet; and finally, a fixing device applies heat and pressure to the sheet bearing the toner image to fix the toner image on the sheet, thus forming the toner image on the sheet.

Such image forming apparatuses may include an image reader for reading an image on an original document sheet inserted by a user so as to generate image data. For example, the user inserts the original document sheet into the image reader in such a manner that a leading edge of the original document sheet is fed between driving rollers and driven rollers of feed roller pairs, respectively. In other words, a direction in which the feed roller pairs feed the original document sheet is determined based on a direction in and an angle at which the original document sheet contacts nip portions of the feed roller pairs.

The driven rollers of the feed roller pairs include side driven rollers, provided on both side portions of a driven shaft supporting the driven rollers in an axial direction of the driven shaft, and center driven rollers, provided on a center portion of the driven shaft in the axial direction of the driven shaft. The side driven rollers are formed of hard plastic and the center driven rollers are formed of foam rubber, so that the user can sense contact of the original document sheet with the feed roller pairs precisely.

However, when the center driven rollers formed of the foam rubber press against the opposing center driving rollers, the pressure of that contact may deform the center driven rollers. Accordingly, the nip portions formed between the center driven rollers and the center driving rollers may be misaligned with the nip portions formed between the side driven rollers and the side driving rollers in a sub-scanning direction, that is, an original document sheet conveyance direction, as well as in a direction perpendicular to the original document sheet conveyance direction. Consequently, such misalignment of the nip portions may crease the original document sheet conveyed through the nip portions.

Further, in order to reduce creasing of the original document sheet, a bearing for supporting a center portion of a driving shaft supporting the driving rollers in an axial direction of the driving shaft may be shifted downstream in the original document sheet conveyance direction, so as to bend the driving shaft. Accordingly, the nip portions formed between the center driven rollers and the center driving rollers may be misaligned with the nip portions formed between the side driven rollers and the side driving rollers in the sub-scanning direction, that is, the original document sheet conveyance direction. Consequently, when the user inserts the original document sheet into the nip portions and thereby the leading edge of the original document sheet contacts the nip portions, such misalignment of the nip portions may skew the original document sheet. As a result, the image reader may not read an image on the original document sheet properly.

SUMMARY

At least one embodiment may provide a sheet conveyance device that includes a plurality of driving rollers, a driving shaft, a plurality of driven rollers, and a driven shaft. The plurality of driving rollers includes a hard material. The driving shaft supports the plurality of driving rollers at centers of axes of the plurality of driving rollers. The plurality of driven rollers opposes the plurality of driving rollers to form nip portions between the plurality of driven rollers and the plurality of driving rollers. The driven shaft is provided above the driving shaft to support the plurality of driven rollers at centers of axes of the plurality of driven rollers.

The plurality of driving rollers and the plurality of driven rollers rotate and nip a sheet at the nip portions to feed the sheet. The driving shaft is rotatably supported in such a manner that a center portion of the driving shaft in an axial direction of the driving shaft is bent downstream in a sheet conveyance direction so that the plurality of driving rollers is shifted downstream in the sheet conveyance direction and tilted with respect to the sheet conveyance direction in a V-like shape about a center line in a width direction of the sheet. The plurality of driven rollers includes at least one center driven roller and at least one side driven roller. The at least one center driven roller is provided on a center portion of the driven shaft in an axial direction of the driven shaft, and includes a soft material. The at least one side driven roller is provided on each side portion of the driven shaft in the axial direction of the driven shaft, and includes a hard material. The plurality of driven rollers is shifted downstream in the sheet conveyance direction by an amount determined by an amount by which the plurality of driving rollers is shifted downstream in the sheet conveyance direction.

At least one embodiment may provide an image reader that includes a sheet conveyance device including a plurality of driving rollers, a driving shaft, a plurality of driven rollers, and a driven shaft. The plurality of driving rollers includes a hard material. The driving shaft supports the plurality of driving rollers at centers of axes of the plurality of driving rollers. The plurality of driven rollers opposes the plurality of driving rollers to form nip portions between the plurality of driven rollers and the plurality of driving rollers. The driven shaft is provided above the driving shaft to support the plurality of driven rollers at centers of axes of the plurality of driven rollers.

The plurality of driving rollers and the plurality of driven rollers rotate and nip a sheet at the nip portions to feed the sheet. The driving shaft is rotatably supported in such a manner that a center portion of the driving shaft in an axial direction of the driving shaft is bent downstream in a sheet conveyance direction so that the plurality of driving rollers is shifted downstream in the sheet conveyance direction and tilted with respect to the sheet conveyance direction in a V-like shape about a center line in a width direction of the sheet. The plurality of driven rollers includes at least one center driven roller and at least one side driven roller. The at least one center driven roller is provided on a center portion of the driven shaft in an axial direction of the driven shaft, and includes a soft material. The at least one side driven roller is provided on each side portion of the driven shaft in the axial direction of the driven shaft, and includes a hard material. The plurality of driven rollers is shifted downstream in the sheet conveyance direction by an amount determined by an amount by which the plurality of driving rollers is shifted downstream in the sheet conveyance direction.

At least one embodiment may provide an image forming apparatus that includes a sheet conveyance device including a plurality of driving rollers, a driving shaft, a plurality of driven rollers, and a driven shaft. The plurality of driving rollers includes a hard material. The driving shaft supports the plurality of driving rollers at centers of axes of the plurality of driving rollers. The plurality of driven rollers opposes the plurality of driving rollers to form nip portions between the plurality of driven rollers and the plurality of driving rollers. The driven shaft is provided above the driving shaft to support the plurality of driven rollers at centers of axes of the plurality of driven rollers.

The plurality of driving rollers and the plurality of driven rollers rotate and nip a sheet at the nip portions to feed the sheet. The driving shaft is rotatably supported in such a manner that a center portion of the driving shaft in an axial direction of the driving shaft is bent downstream in a sheet conveyance direction so that the plurality of driving rollers is shifted downstream in the sheet conveyance direction and tilted with respect to the sheet conveyance direction in a V-like shape about a center line in a width direction of the sheet. The plurality of driven rollers includes at least one center driven roller and at least one side driven roller. The at least one center driven roller is provided on a center portion of the driven shaft in an axial direction of the driven shaft, and includes a soft material. The at least one side driven roller is provided on each side portion of the driven shaft in the axial direction of the driven shaft, and includes a hard material. The plurality of driven rollers is shifted downstream in the sheet conveyance direction by an amount determined by an amount by which the plurality of driving rollers is shifted downstream in the sheet conveyance direction.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
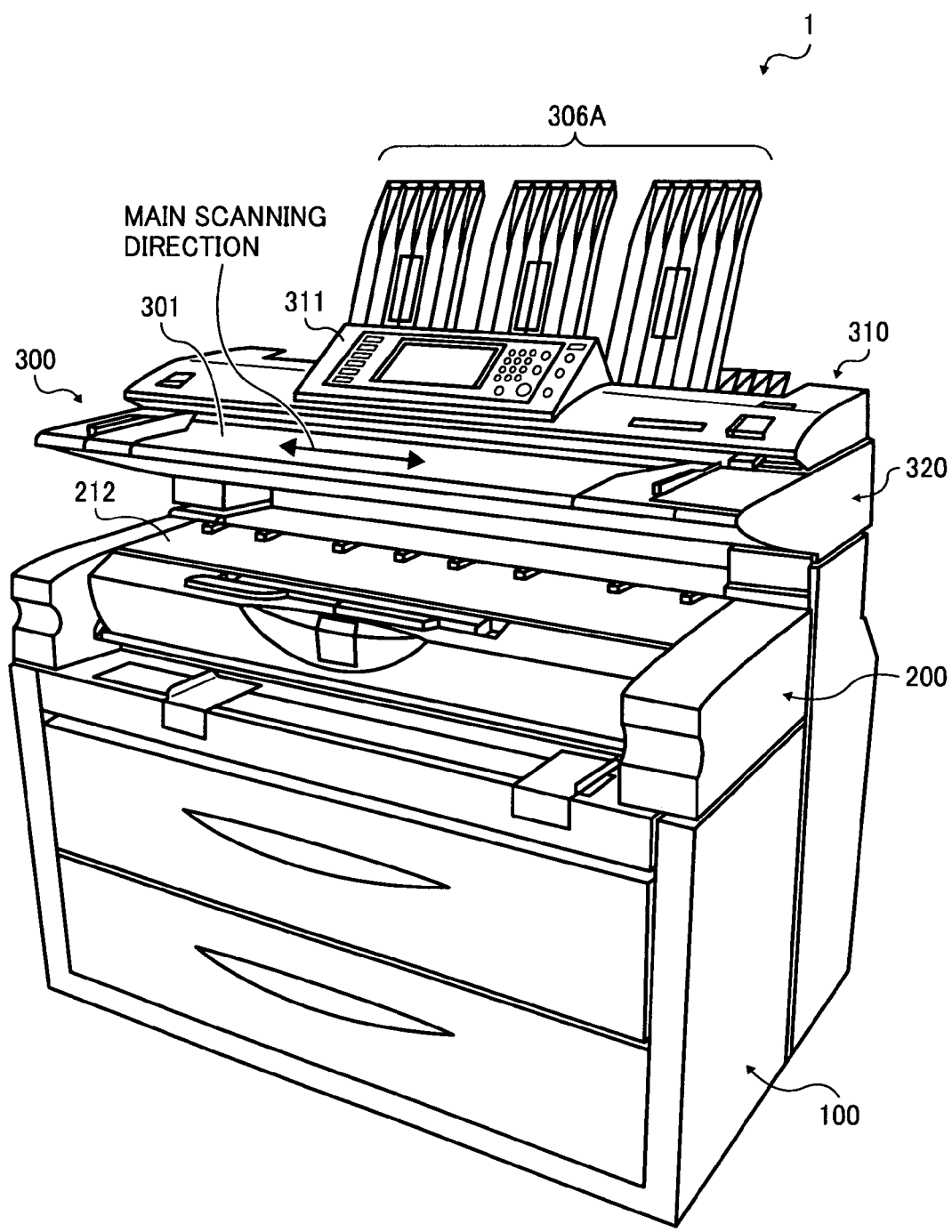
FIG. 1 is an external perspective view of an image forming apparatus according to an example embodiment.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Figure 2:
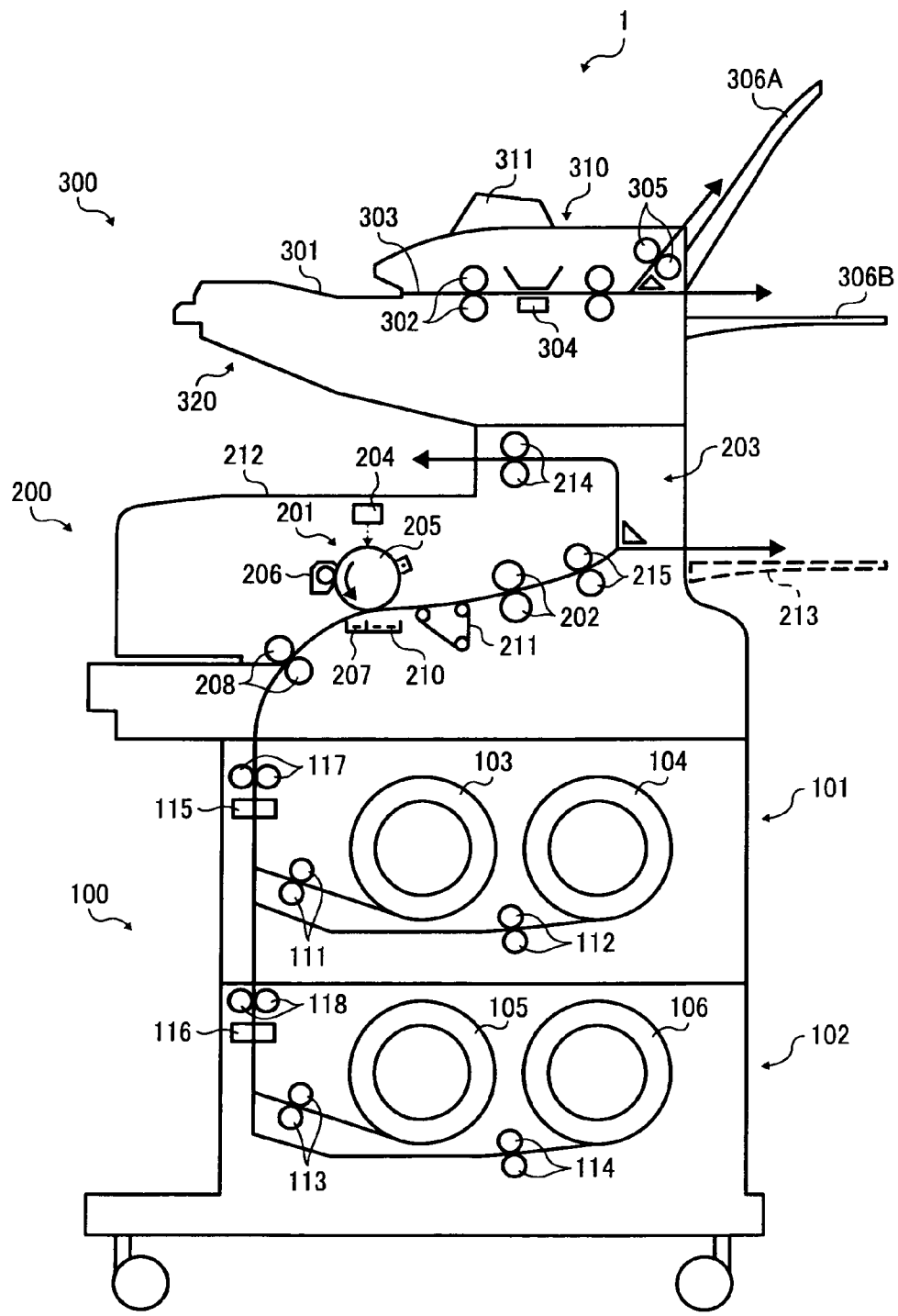
FIG. 2 is a schematic side view (according to an example embodiment) of the image forming apparatus shown in FIG. 1.

Referring now to the drawings, wherein like reference numerals designate identical or corresponding parts throughout the several views, particularly to FIGS. 1 and 2, an image forming apparatus 1 according to an example embodiment is explained.

FIG. 1 is an external perspective view of the image forming apparatus 1. The image forming apparatus 1 includes a sheet supply device 100, a copier body 200, and/or a scanner 300. The copier body 200 includes an output tray 212. The scanner 300 includes an upper body 310 and/or a lower body 320. The upper body 310 includes an output tray 306A and/or a control panel 311. The lower body 320 includes an original document sheet tray 301.

FIG. 2 is a schematic side view of the image forming apparatus 1. The scanner 300 further includes a feed roller pair 302, an original document sheet conveyance path 303, and/or an output roller pair 305. The lower body 320 further includes a contact-type image sensor 304 and/or an output tray 306B.

The copier body 200 further includes an image forming device 201, a fixing device 202, an output device 203, a transfer device 207, a registration roller pair 208, a separator 210, and/or a conveyance belt 211.

The image forming device 201 includes an LED (light-emitting diode) writer 204, a photoconductor 205, and/or a development device 206. The output device 203 includes output roller pairs 214 and 215 and/or an output tray 213.

The sheet supply device 100 includes paper roll trays 101 and 102. The paper roll tray 101 includes paper rolls 103 and 104, feed roller pairs 111 and 112, a roll cutter unit 115, and/or a conveyance roller pair 117. The paper roll tray 102 includes paper rolls 105 and 106, feed roller pairs 113 and 114, a roll cutter unit 116, and/or a conveyance roller pair 118.

Figure 3:
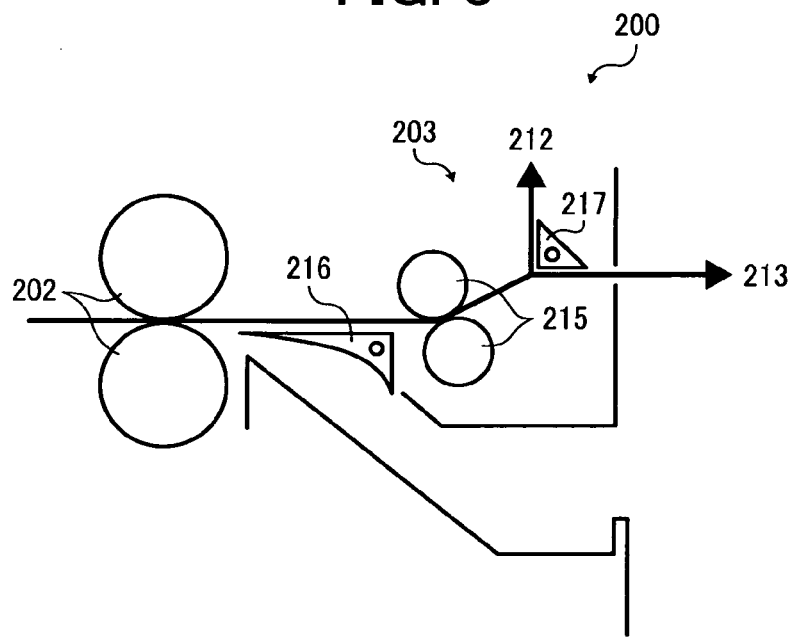
FIG. 3 is a partial side view (according to an example embodiment) of an output device included in the image forming apparatus shown in FIG. 2.

FIG. 3 is a partial side view of the output device 203. The output device 203 further includes branch nails 216 and 217.

The image forming apparatus 1 depicted in FIGS. 1 and 2 can be a copier, a facsimile machine, a printer, a plotter, a multifunction printer having at least one of copying, printing, scanning, plotter, and facsimile functions, or the like. According to this example embodiment, the image forming apparatus 1 functions as a digital wide format copier for forming an image on a recording medium (e.g., a sheet) by electrophotography.

As illustrated in FIG. 1, the copier body 200 is provided on the sheet supply device 100. The scanner 300, serving as an image reader, is provided on the copier body 200.

As illustrated in FIG. 2, in the scanner 300, the feed roller pair 302 feeds original document sheets placed on the original document sheet tray 301 one by one to the original document sheet conveyance path 303. The contact-type image sensor 304, serving as a reader, reads an image on an original document sheet conveyed on the original document sheet conveyance path 303. When the contact-type image sensor 304 finishes reading the image on the original document sheet, the output roller pair 305 discharges the original document sheet onto the output tray 306A or 306B.

The contact-type image sensor 304 has a box-like shape elongated in a main scanning direction, and includes a light source and an image sensor. The light source irradiates the original document sheet conveyed on the original document sheet conveyance path 303. Light reflected by the original document sheet forms an image on the image sensor via a lens array and/or the like to output an image signal by photoelectric conversion.

Image processing is performed on the image signal, and the LED writer 204 forms an electrostatic latent image on a uniformly charged surface of the photoconductor 205 according to the processed image signal. The development device 206 develops the electrostatic latent image with toner particles to make the electrostatic latent image visible as a toner image.

The registration roller pair 208 feeds a recording sheet sent from the sheet supply device 100 toward the transfer device 207 at a proper time in synchrony with an image formation time. The transfer device 207 transfers the toner image formed on the photoconductor 205 onto the recording sheet fed by the registration roller pair 208. The separator 210 separates the recording sheet bearing the toner image from the photoconductor 205. The conveyance belt 211 guides the recording sheet bearing the toner image toward the fixing device 202. The fixing device 202 applies heat and pressure to the recording sheet to fix the toner image on the recording sheet.

In the output device 203, the output roller pair 215 feeds the recording sheet bearing the fixed toner image onto the output tray 213 provided in a rear portion of the copier body 200. Alternatively, the output roller pair 214 feeds the recording sheet bearing the fixed toner image onto the output tray 212 provided in a top portion of the copier body 200.

For example, the branch nails 216 and 217 rotate to guide the recording sheet bearing the fixed toner image to the output tray 213 or 212, as illustrated in FIG. 3.

In the sheet supply device 100, the paper roll trays 101 and 102 form a two-tier structure in a vertical direction. A user in front of the image forming apparatus 1 can pull the paper roll trays 101 and 102 out of the image forming apparatus 1 in a leftward direction in FIG. 2, so as to set the paper rolls 103 to 106 or remove jammed paper. Each of the paper roll trays 101 and 102 contains two paper rolls. For example, the paper roll tray 101 contains the paper rolls 103 and 104, and the paper roll tray 102 contains the paper rolls 105 and 106. The feed roller pairs 111, 112, 113, and 114 are provided near the corresponding paper rolls 103, 104, 105, and 106, respectively.

The roll cutter unit 115 is provided at a front portion (e.g., left in FIG. 2) of the paper roll tray 101, and cuts paper reeled out of the paper roll 103 or 104 and fed by the feed roller pair 111 or 112 into sheets having a reference length. The conveyance roller pair 117 feeds the sheets toward the copier body 200 as recording sheets.

Similarly, the roll cutter unit 116 is provided at a front portion (e.g., left in FIG. 2) of the paper roll tray 102, and cuts paper reeled out of the paper roll 105 or 106 and fed by the feed roller pair 113 or 114 into sheets having a reference length. The conveyance roller pair 118 feeds the sheets toward the copier body 200 as recording sheets.

As illustrated in FIG. 1, the control panel 311 is provided in the upper body 310 of the scanner 300. Using the control panel 311, the user inputs commands for setting various operation modes, starting an operation, making settings, such as repeated copy, and entering information about a recording sheet, such as size of a recording sheet.

Figure 4:
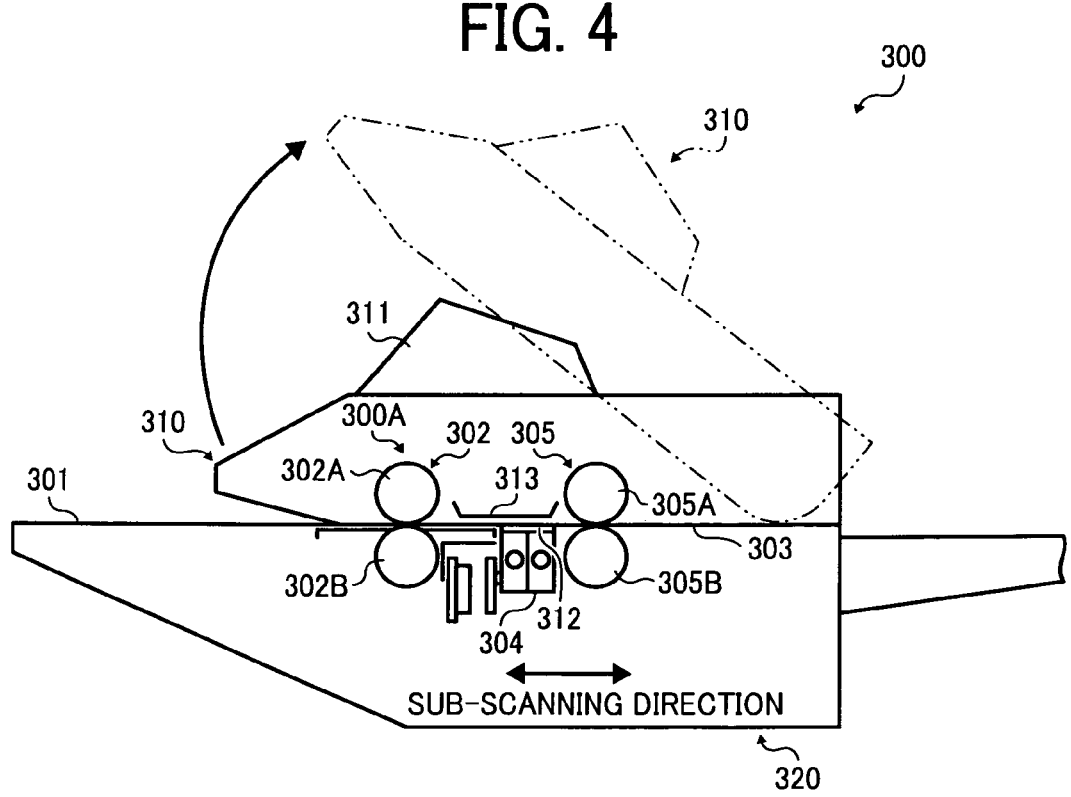
FIG. 4 is a sectional view (according to an example embodiment) of a scanner included in the image forming apparatus shown in FIG. 2.

FIG. 4 is a sectional view of an interior of the upper body 310 and the lower body 320 of the scanner 300. The scanner 300 further includes a sheet conveyance device 300A. The upper body 310 further includes an exposure glass cover 313. The lower body 320 further includes an exposure glass 312. The feed roller pair 302 includes a driven roller 302A and/or a driving roller 302B. The output roller pair 305 includes a driven roller 305A and/or a driving roller 305B.

The control panel 311 is provided on an outer top of the upper body 310. The lower body 320 rotatably supports a part of a right portion in FIG. 4 of the upper body 310 so that a left portion in FIG. 4 (e.g., a front portion) of the upper body 310 serves as a free end. Thus, the upper body 310 is openable and closable with respect to the lower body 320. The original document sheet conveyance path 303 is provided under the upper body 310 and above the lower body 320.

The driven roller 302A of the feed roller pair 302 and the driven roller 305A of the output roller pair 305 are provided in the upper body 310.

The exposure glass cover 313 is provided at a position between the driven roller 302A of the feed roller pair 302 and the driven roller 305A of the output roller pair 305 in an original document sheet conveyance direction (e.g., a sub-scanning direction). The exposure glass cover 313 opposes the exposure glass 312 through which the contact-type image sensor 304 provided in the lower body 320 irradiates the original document sheet conveyed on the original document sheet conveyance path 303. The exposure glass cover 313 serves as a white reference plate for pressing the original document sheet against the exposure glass 312.

The driving roller 302B of the feed roller pair 302 and the driving roller 305B of the output roller pair 305 are provided in the lower body 320. The driving roller 302B of the feed roller pair 302 is provided upstream from the driving roller 305B of the output roller pair 305 in the original document sheet conveyance direction. The contact-type image sensor 304 is provided at a position between the driving roller 302B of the feed roller pair 302 and the driving roller 305B of the output roller pair 305 in the lower body 320 in such a manner that the contact-type image sensor 304 opposes the exposure glass cover 313 of the upper body 310.

Figure 5:
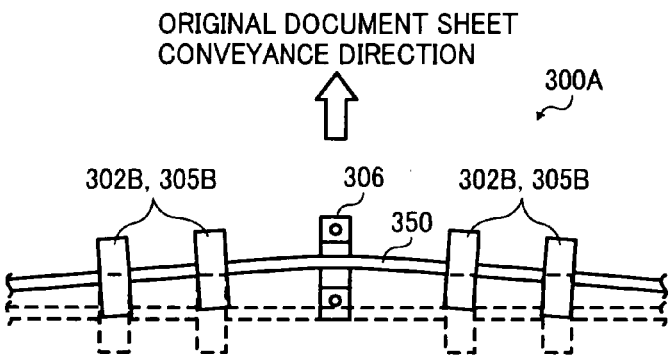
FIG. 5 is a partial top view (according to an example embodiment) of a sheet conveyance device included in the scanner shown in FIG. 4.

FIG. 5 is a partial top view of the sheet conveyance device 300A. The sheet conveyance device 300A further includes a bearing 306 and/or a driving shaft 350.

The driving shaft 350 (e.g., a core metal) supports a center of axis of each of the driving roller 302B and the driving roller 305B. The bearing 306 is provided in a center portion of the driving shaft 350 in a longitudinal direction (e.g., an axial direction) of the driving shaft 350, and supports the driving shaft 350. The bearing 306 is shifted downstream in the original document sheet conveyance direction, so that the center portion of the driving shaft 350 in the axial direction of the driving shaft 350 is also shifted downstream in the original document sheet conveyance direction. In other words, the center portion of the driving shaft 350 in the axial direction of the driving shaft 350 is bent downstream in the original document sheet conveyance direction. Accordingly, the driving rollers 302B and 305B are tilted with respect to the original document sheet conveyance direction. For example, the left driving roller 302B and the right driving roller 302B, which opposes the left driving roller 302B via the bearing 306, are tilted with respect to the original document sheet conveyance direction, that is, a center line in a width direction (e.g., the main scanning direction) of an original document sheet in a V-like shape about the center line in the width direction of the original document sheet.

Figure 6A:
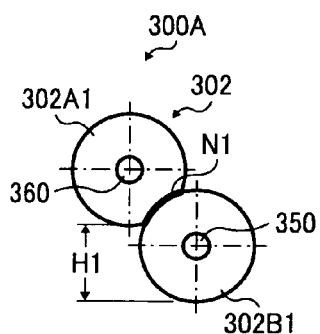
FIG. 6A is a sectional side view (according to an example embodiment) of the sheet conveyance device shown in FIG. 5.
Figure 6B:
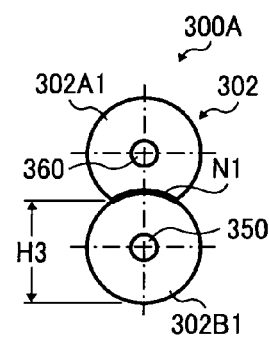
FIG. 6B is another sectional side view (according to an example embodiment) of the sheet conveyance device shown in FIG. 5.
Figure 6C:
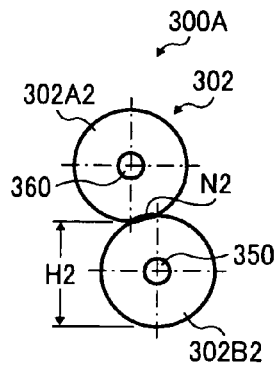
FIG. 6C is yet another sectional side view (according to an example embodiment) of the sheet conveyance device shown in FIG. 5.
Figure 6D:
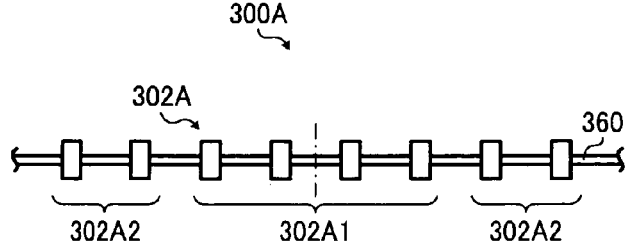
FIG. 6D is a partial front view (according to an example embodiment) of the sheet conveyance device shown in FIG. 5.

FIGS. 6A, 6B, and 6C illustrate a sectional side view of the sheet conveyance device 300A. FIG. 6D is a partial front view of the sheet conveyance device 300A. As illustrated in FIGS. 6A and 6B, the sheet conveyance device 300A further includes a driven shaft 360, a center driven roller 302A1, and/or a center driving roller 302B1. As illustrated in FIG. 6C, the sheet conveyance device 300A further includes a side driven roller 302A2 and/or a side driving roller 302B2.

As illustrated in FIG. 6D, the single driven shaft 360 supports a center of axis of each of the driven rollers 302A including the center driven rollers 302A1 and the side driven rollers 302A2. For example, the four center driven rollers 302A1 are provided on a center portion of the driven shaft 360 in a longitudinal direction (e.g., an axial direction) of the driven shaft 360, and include relatively soft foam rubber. The four side driven rollers 302A2 are provided on both side portions of the driven shaft 360 in the axial direction of the driven shaft 360, and include relatively hard plastic or hard rubber.

As illustrated in FIG. 6A, pressure applied by the center driving roller 302B1, which presses against the center driven roller 302A1, deforms the center driven roller 302A1. For example, a length of a nip portion N1 formed between the soft center driven roller 302A1 and the center driving roller 302B1 is longer than a length of a nip portion N2 formed between the hard side driven roller 302A2 and the side driving roller 302B2 as illustrated in FIG. 6C. Accordingly, when the user inserts an original document sheet onto the original document sheet tray 301 depicted in FIG. 4, a leading edge of a center portion of the original document sheet contacts the nip portion N1 formed between the center driven roller 302A1 and the center driving roller 302B1.

The center portion of the driving shaft 350 supporting the center of axis of each of the driving rollers 302B is bent downstream in the original document sheet conveyance direction as illustrated in FIG. 5. Therefore, a height H1 of an entrance to the nip portion N1 formed between the soft center driven roller 302A1 and the hard center driving roller 302B1 illustrated in FIG. 6A is smaller than a height H2 of an entrance to the nip portion N2 formed between the hard side driven roller 302A2 and the hard side driving roller 302B2 illustrated in FIG. 6C. To address this, in order to cause the height H1 to be equivalent to the height H2 in the original document sheet conveyance direction and in a vertical direction, the four center driven rollers 302A1 are displaced downstream in the original document sheet conveyance direction according to an amount of deformation of the center driven rollers 302A1 and an amount of bending (e.g., tilt) of the center driving rollers 302B1 caused by pressure, as illustrated in FIG. 6B. In FIG. 6B, a height H3 indicates a height of the entrance to the nip portion N1 formed between the center driven roller 302A1 and the center driving roller 302B1. Thus, the height H2 is equivalent to the height H3. Consequently, even when the user inserts a wide original document sheet onto the original document sheet tray 301 depicted in FIG. 4, a leading edge of the wide original document sheet contacts the entrance to the nip portion N1 formed between the center driven roller 302A1 and the center driving roller 302B1 and the entrance to the nip portion N2 formed between the side driven roller 302A2 and the side driving roller 302B2, and is inserted into the nip portions N1 and N2 straight, because the height H3 of the entrance to the nip portion N1 provided in the center portion of the driven shaft 360 and the driving shaft 350 in the axial direction of the driven shaft 360 and the driving shaft 350 is equivalent to the height H2 of the entrance to the nip portion N2 provided in both side portions of the driven shaft 360 and the driving shaft 350 in the axial direction of the driven shaft 360 and the driving shaft 350.

Figure 7:
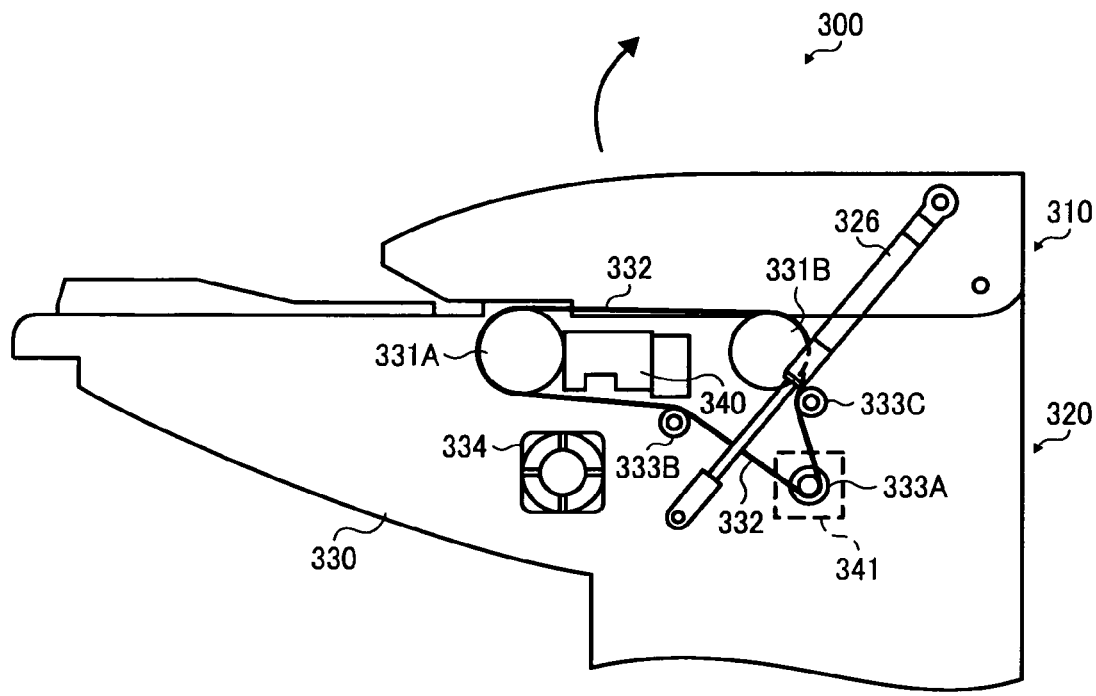
FIG. 7 is a sectional side view (according to an example embodiment) of a side portion of the scanner shown in FIG. 4.

FIG. 7 is a sectional side view of a side portion of the lower body 320 of the scanner 300. The lower body 320 further includes a side plate 330, pulleys 331A and 331B, a driving pulley 333A, intermediate pulleys 333B and 333C, a timing belt 332, a driving motor 341, an electromagnetic clutch 340, a fan 334, and/or a force applier 326.

The pulleys 331A and 331B, the driving pulley 333A, and the intermediate pulleys 333B and 333C are provided on the side plate 330. The pulley 331A is provided on the electromagnetic clutch 340. The pulley 331B is connected to the driving roller 305B of the output roller pair 305 depicted in FIG. 4. The timing belt 332 is looped over the pulleys 331A and 331B, the driving pulley 333A, and the intermediate pulleys 333B and 333C. The driving pulley 333A is connected to the driving motor 341 for driving the timing belt 332.

A driving force generated by the driving motor 341 is transmitted to the driving roller 302B of the feed roller pair 302 and the driving roller 305B of the output roller pair 305 (depicted in FIG. 4) via the timing belt 332, the driving pulley 333A, and the intermediate pulleys 333B and 333C.

The electromagnetic clutch 340 is turned off when a trailing edge of a previous original document sheet has passed through the output roller pair 305. Thus, a driving force is not transmitted to the feed roller pair 302. Accordingly, even when a next original document sheet is accidentally inserted, the feed roller pair 302 does not pull in the next original document sheet, preventing malfunction of the image forming apparatus 1 depicted in FIG. 2. Further, a brake is provided in the electromagnetic clutch 340 to prevent the feed roller pair 302 from accidentally rotating due to an impact applied by an original document sheet inserted into the feed roller pair 302 and thereby prevent a leading edge of the original document sheet from skewing.

The fan 334, serving as a fan member, is provided on the side plate 330 under the pulley 331A, and cools the contact-type image sensor 304 depicted in FIG. 4 and the like provided inside the lower body 320.

The force applier 326 includes a gas spring structure for applying a force to the upper body 310 to open (e.g., rotate) the upper body 310.

Figure 8:
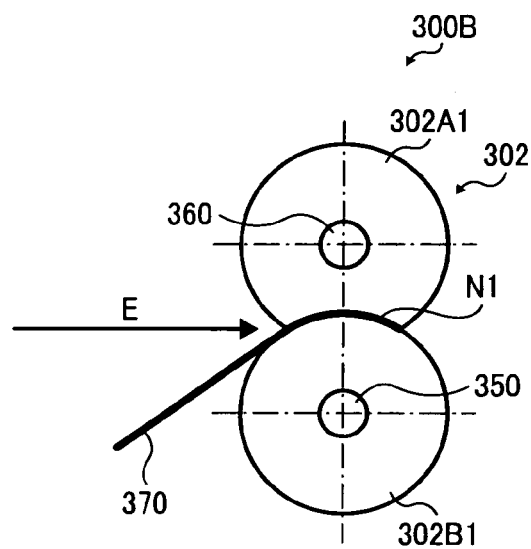
FIG. 8 is a sectional side view of a sheet conveyance device according to another example embodiment.

Referring to FIG. 8, the following describes a modification example of the above-described sheet conveyance device 300A. FIG. 8 is a sectional side view of a sheet conveyance device 300B according to another example embodiment. The sheet conveyance device 300B includes a resin sheet 370 and/or an original document sheet entering path E. The other elements of the sheet conveyance device 300B are common to the sheet conveyance device 300A depicted in FIG. 4.

The resin sheet 370 (e.g., a guide Mylar (registered trademark) or a guide sheet) guides a leading edge of an original document sheet to the entrance to the nip portion N1 formed between the center driven roller 302A1 and the center driving roller 302B1 and the entrance to the nip portion N2 formed between the side driven roller 302A2 and the side driving roller 302B2 depicted in FIG. 6C.

When the center driven roller 302A1 includes an elastic body, a leading edge of a curled or folded original document sheet entering into the nip portion N1 may be caught by the center driven roller 302A1. Accordingly, the original document sheet may not be inserted into the nip portion N1 smoothly. For example, the original document sheet may be skewed.

To address this, the resin sheet 370 including a low friction material is tilted to form a slope for smoothly guiding the original document sheet, which is to enter into the nip portion N1 along the original document sheet entering path E, upward (e.g., in an oblique direction) to the nip portion N1. Accordingly, even when the leading edge of the original document sheet is caught by the center driven roller 302A1 when the original document sheet enters into the nip portion N1, the original document sheet slides on the resin sheet 370 and enters into the nip portion N1 smoothly. Thus, the resin sheet 370 causes various types of original document sheet to enter into the nip portion N1 smoothly.

A Teflon (registered trademark)-coated layer may be formed on a surface of the driven roller 302A depicted in FIG. 4, so that the original document sheet slides on the surface of the driven roller 302A and enters into the nip portions N1 and N2 smoothly. Further, the Teflon (registered trademark)-coated layer prevents or reduces dust adhering to the driven roller 302A and thereafter reattaching from the driven roller 302A to the original document sheet.

The driven shaft 360 supports each driven roller 302A (e.g., the center driven rollers 302A1 and/or the side driven rollers 302A2 depicted in FIG. 6D) in such a manner that each driven roller 302A rotates individually and independently of any other driven roller 302A. Accordingly, the driven rollers 302A rotate at different speeds, respectively, suppressing bending of the driven rollers 302A. Namely, the driven shaft 360 supports the driven rollers 302A in such a manner that the driven rollers 302A rotate relatively. Accordingly, a force applied from the original document sheet in the original document sheet conveyance direction rotates the driven rollers 302A at different speeds, respectively.

For example, when a single driven shaft 360 supports centers of axes of two center driven rollers 302A1 in such a manner that the two center driven rollers 302A1 are fixed to the single driven shaft 360, the two center driven rollers 302A1 rotate synchronously. Accordingly, the two center driven rollers 302A1 feed the original document sheet at a middle speed between rotation speeds of the two center driven rollers 302A1 while the two center driven rollers 302A1 slip on the original document sheet. Further, when the center driven roller 302A1 includes foam rubber, the center driven roller 302A1 has an increased grip force, and thereby the two center driven rollers 302A1 do not generate difference in rotation speed. Accordingly, the two center driven rollers 302A1 may not easily prevent or reduce bending and creasing generated on a thin original document sheet fed by the center driven rollers 302A1.

To address this, according to the above-described example embodiments, each center driven roller 302A1 is driven independently of any other center driven roller 302A1. In other words, the center driven roller 302A1 rotates at a speed different from a speed at which the adjacent center driven roller 302A1 rotates, easily preventing or reducing bending and creasing generated on the thin original document sheet.

As illustrated in FIG. 6A, according to the above-described example embodiments, when a center portion of a driving shaft (e.g., the driving shaft 350) in an axial direction of the driving shaft is displaced downstream in an original document sheet conveyance direction as illustrated in FIG. 5, a center driven roller (e.g., the center driven roller 302A1) is shifted according to an amount of bending of a center driving roller (e.g., the center driving roller 302B1) supported by the driving shaft. Accordingly, a position of an entrance to a nip portion (e.g., the nip portion N1) formed between the center driven roller and the center driving roller provided on the center portion of the driving shaft in the axial direction of the driving shaft is aligned to a position of an entrance to a nip portion (e.g., the nip portion N2 depicted in FIG. 6C) formed between a side driven roller (e.g., the side driven roller 302A2 depicted in FIG. 6C) and a side driving roller (e.g., the side driving roller 302B2 depicted in FIG. 6C) provided on each of both side portions of the driving shaft in a sub-scanning direction and in a direction perpendicular to the original document sheet conveyance direction. Thus, when a user inserts an original document sheet into the nip portions, the original document sheet contacts the nip portions and a position of a leading edge of the original document sheet is corrected. For example, even when the user inserts the original document sheet obliquely with respect to the nip portions, the original document sheet may not be skewed.

When the center driven roller includes an elastic body, a leading edge of a curled or folded original document sheet entering into the nip portions may be caught by the center driven roller. Accordingly, the original document sheet may not be inserted into the nip portions smoothly. For example, the original document sheet may be inserted into the nip portions obliquely.

As illustrated in FIG. 8, a guide sheet (e.g., the resin sheet 370) is provided obliquely with respect to the nip portions to form a slope for smoothly guiding the original document sheet, which is to enter into the nip portions along an original document sheet entering path (e.g., the original document sheet entering path E), upward toward the nip portions. Accordingly, even when the leading edge of the original document sheet is caught by the center driven roller when the original document sheet enters into the nip portion, the original document sheet slides on the guide sheet to enter into the nip portions smoothly. Thus, the guide sheet causes various types of original document sheet to enter into the nip portions smoothly.

A driven roller (e.g., the driven roller 302A depicted in FIG. 4) may include a Teflon (registered trademark)-coated layer as a surface layer so that the original document sheet slides on the surface of the driven roller and enters into the nip portions smoothly. Further, the Teflon (registered trademark)-coated layer prevents or reduces dust adhering to the driven roller and thereafter reattaching from the driven roller to the original document sheet.

As illustrated in FIG. 6D, a driven shaft (e.g., the driven shaft 360) supports each driven roller in such a manner that each driven roller rotates individually and independently of any other driven roller. Accordingly, the driven rollers rotate at different speeds, respectively, suppressing bending of the original document sheet.

The present invention has been described above with reference to specific example embodiments. Nonetheless, the present invention is not limited to the details of example embodiments described above, but various modifications and improvements are possible without departing from the spirit and scope of the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. A sheet conveyance device, comprising:
a plurality of driving rollers including a hard material;
a driving shaft to support the plurality of driving rollers at centers of axes of the plurality of driving rollers;
a plurality of driven rollers to oppose the plurality of driving rollers to form nip portions between the plurality of driven rollers and the plurality of driving rollers; and
a driven shaft provided above the driving shaft to support the plurality of driven rollers at centers of axes of the plurality of driven rollers,
the plurality of driving rollers and the plurality of driven rollers rotating and nipping a sheet at the nip portions to feed the sheet,
the driving shaft rotatably supported in such a manner that a center portion of the driving shaft in an axial direction of the driving shaft is bent downstream in a sheet conveyance direction,
the plurality of driving rollers being shifted downstream in the sheet conveyance direction and tilted with respect to the sheet conveyance direction in a V-like shape about a center line in a width direction of the sheet,
the plurality of driven rollers, including,
at least one center driven roller provided on a center portion of the driven shaft in an axial direction of the driven shaft, and including a soft material; and
at least one side driven roller provided on each side portion of the driven shaft in the axial direction of the driven shaft, and including a hard material,
the plurality of driven rollers being shifted downstream in the sheet conveyance direction by an amount determined based upon an amount by which the plurality of driving rollers is shifted downstream in the sheet conveyance direction and an amount of deformation of the plurality of driven rollers due to pressure applied by the plurality of driving rollers.

2. The sheet conveyance device according to claim 1, further comprising:
a resin sheet to guide the sheet to the nip portions formed between the plurality of driven rollers and the plurality of driving rollers.

3. The sheet conveyance device according to claim 1, wherein each of the plurality of driven rollers comprises a Teflon (registered trademark)-coated layer as a surface layer.

4. The sheet conveyance device according to claim 1, wherein the driven shaft supports the plurality of driven rollers in such a manner that each driven roller rotates individually and independently of any other driven roller.

5. An image reader, comprising:
a sheet conveyance device, comprising:
a plurality of driving rollers including a hard material;
a driving shaft to support the plurality of driving rollers at centers of axes of the plurality of driving rollers;
a plurality of driven rollers to oppose the plurality of driving rollers to form nip portions between the plurality of driven rollers and the plurality of driving rollers; and
a driven shaft provided above the driving shaft to support the plurality of driven rollers at centers of axes of the plurality of driven rollers,
the plurality of driving rollers and the plurality of driven rollers rotating and nipping a sheet at the nip portions to feed the sheet, the driving shaft rotatably supported in such a manner that a center portion of the driving shaft in an axial direction of the driving shaft is bent downstream in a sheet conveyance direction, the plurality of driving rollers being shifted downstream in the sheet conveyance direction and tilted with respect to the sheet conveyance direction in a V-like shape about a center line in a width direction of the sheet, the plurality of driven rollers, including:

at least one center driven roller provided on a center portion of the driven shaft in an axial direction of the driven shaft, and including a soft material; and at least one side driven roller provided on each side portion of the driven shaft in the axial direction of the driven shaft, and including a hard material, the plurality of driven rollers being shifted downstream in the sheet conveyance direction by an amount determined based upon an amount by which the plurality of driving rollers is shifted downstream in the sheet conveyance direction and an amount of deformation of the plurality of driven rollers due to pressure applied by the plurality of driving rollers.

6. The image reader according to claim 5, wherein the sheet conveyance device further comprises a resin sheet to guide the sheet to the nip portions formed between the plurality of driven rollers and the plurality of driving rollers.

7. The image reader according to claim 5, wherein each of the plurality of driven rollers comprises a Teflon (registered trademark)-coated layer as a surface layer.

8. The image reader according to claim 5, wherein the driven shaft supports the plurality of driven rollers in such a manner that each driven roller rotates individually and independently of any other driven roller.

9. An image forming apparatus, comprising:

a sheet conveyance device, comprising:

a plurality of driving rollers including a hard material;

a driving shaft to support the plurality of driving rollers at centers of axes of the plurality of driving rollers;

a plurality of driven rollers to oppose the plurality of driving rollers to form nip portions between the plurality of driven rollers and the plurality of driving rollers; and a driven shaft provided above the driving shaft to support the plurality of driven rollers at centers of axes of the plurality of driven rollers, the plurality of driving rollers and the plurality of driven rollers rotating and nipping a sheet at the nip portions to feed the sheet, the driving shaft rotatably supported in such a manner that a center portion of the driving shaft in an axial direction of the driving shaft is bent downstream in a sheet conveyance direction, the plurality of driving rollers being shifted downstream in the sheet conveyance direction and tilted with respect to the sheet conveyance direction in a V-like shape about a center line in a width direction of the sheet, the plurality of driven rollers including:

at least one center driven roller provided on a center portion of the driven shaft in an axial direction of the driven shaft, and including a soft material; and at least one side driven roller provided on each side portion of the driven shaft in the axial direction of the driven shaft, and including a hard material, the plurality of driven rollers being shifted downstream in the sheet conveyance direction by an amount determined based upon an amount by which the plurality of driving rollers is shifted downstream in the sheet conveyance direction and an amount of deformation of the plurality of driven rollers due to pressure applied by the plurality of driving rollers.

10. The image forming apparatus according to claim 9, wherein the sheet conveyance device further comprises a resin sheet to guide the sheet to the nip portions formed between the plurality of driven rollers and the plurality of driving rollers.

11. The image forming apparatus according to claim 9, wherein each of the plurality of driven rollers comprises a Teflon (registered trademark)-coated layer as a surface layer.

12. The image forming apparatus according to claim 9, wherein the driven shaft supports the plurality of driven rollers in such a manner that each driven roller rotates individually and independently of any other driven roller.

13. The sheet conveyance device according to claim 1, wherein the plurality of driving rollers comprises:

at least one center driving roller provided on the center portion of the driving shaft in the axial direction of the driving shaft; and at least one side driving roller provided on each side portion of the driving shaft in the axial direction of the driving shaft, wherein the plurality of driven rollers is shifted downstream in the sheet conveyance direction so that a first height of an entrance to a nip portion formed between the at least one center driven roller and the at least one center driving roller is substantially equivalent to a second height of an entrance to a nip portion formed between the at least one side driven roller and the at least one side driving roller.

14. The sheet conveyance device according to claim 1, wherein the plurality of driven rollers is shifted downstream in the sheet conveyance direction so that a position of an entrance to a nip portion formed between the at least one center driven roller and the at least one center driving roller is substantially equivalent to a position of an entrance to a nip portion formed between the at least one side driven roller and the at least one side driving roller in the sheet conveyance direction.

15. The sheet conveyance device according to claim 13, wherein the plurality of driven rollers is shifted downstream in the sheet conveyance direction so that a position of the entrance to the nip portion formed between the at least one center driven roller and the at least one center driving roller is substantially equivalent to a position of the entrance to the nip portion formed between the at least one side driven roller and the at least one side driving roller in the sheet conveyance direction.

16. The sheet conveyance device according to claim 5, wherein the plurality of driving rollers comprises:

at least one center driving roller provided on the center portion of the driving shaft in the axial direction of the driving shaft; and at least one side driving roller provided on each side portion of the driving shaft in the axial direction of the driving shaft, wherein the plurality of driven rollers is shifted downstream in the sheet conveyance direction so that a first height of an entrance to a nip portion formed between the at least one center driven roller and the at least one center driving roller is substantially equivalent to a second height of an entrance to a nip portion formed between the at least one side driven roller and the at least one side driving roller.

17. The sheet conveyance device according to claim 5, wherein the plurality of driven rollers is shifted downstream in the sheet conveyance direction so that a position of an entrance to a nip portion formed between the at least one center driven roller and the at least one center driving roller is substantially equivalent to a position of an entrance to a nip portion formed between the at least one side driven roller and the at least one side driving roller in the sheet conveyance direction.

18. The sheet conveyance device according to claim 9, wherein the plurality of driving rollers comprises:
   at least one center driving roller provided on the center portion of the driving shaft in the axial direction of the driving shaft; and
   at least one side driving roller provided on each side portion of the driving shaft in the axial direction of the driving shaft,
   wherein the plurality of driven rollers is shifted downstream in the sheet conveyance direction so that a first height of an entrance to a nip portion formed between the at least one center driven roller and the at least one center driving roller is substantially equivalent to a second height of an entrance to a nip portion formed between the at least one side driven roller and the at least one side driving roller.

19. The sheet conveyance device according to claim 9, wherein the plurality of driven rollers is shifted downstream in the sheet conveyance direction so that a position of an entrance to a nip portion formed between the at least one center driven roller and the at least one center driving roller is substantially equivalent to a position of an entrance to a nip portion formed between the at least one side driven roller and the at least one side driving roller in the sheet conveyance direction.

* * * * *